United States Patent
Lin et al.

(10) Patent No.: US 6,912,215 B1
(45) Date of Patent: Jun. 28, 2005

(54) METHOD FOR FINDING AND RESERVING AVAILABLE BANDWIDTH IN MULTIHOP MOBILE WIRELESS NETWORKS

(75) Inventors: Hwa-Chun Lin, Taipei (TW); Ping-Chin Fung, Taipei (TW); Chien-Lin Chen, Taipei (TW)

(73) Assignee: Institute For Information Industry, Taipei (TW)

( * ) Notice: Subject to any disclaimer, the term of this patent is extended or adjusted under 35 U.S.C. 154(b) by 812 days.

(21) Appl. No.: 09/711,942

(22) Filed: Nov. 15, 2000

(51) Int. Cl.⁷ ............................................. H04B 7/212
(52) U.S. Cl. ................... 370/347; 370/342; 370/335; 370/337
(58) Field of Search ....................... 370/229, 230, 370/252, 332, 338, 392, 400, 328, 329, 335, 337, 342, 341, 347, 431, 441, 442, 468

(56) References Cited

U.S. PATENT DOCUMENTS 6,621,805 B1 * 9/2003 Kondylis et al. ........... 370/329
6,665,311 B2 * 12/2003 Kondylis et al. ........... 370/462
6,678,253 B1 * 1/2004 Heath et al. ................ 370/265

* cited by examiner

*Primary Examiner*—Ajit Patel
(74) *Attorney, Agent, or Firm*—Bacon & Thomas, PLLC

(57) ABSTRACT

A method for finding and reserving bandwidth in multihop mobile wireless networks is disclosed, which first finds the common free slots of all the links on a path, and marks the common free slots as "available" slots. Then, the slots among the common free slots which are not on the same positions in the TDMA frame as the common free slots of the downstream and upstream links for each link are found and marked as "reservable" slots. The current bandwidth of a link is defined as the current number of reservable slots on the link. Next, An iterative process is performed to try to increase the bandwidth of the link having the smallest current bandwidth such that the bandwidth of the path can be increased.

4 Claims, 5 Drawing Sheets

A AVAILABLE
R RESERVABLE
⊠ UNAVAILABLE
U UNRESERVABLE

{2, 3}     {1, 2, 3}     {1, 2, 5}

(a)

(b)

(c)

(d)

(e)

A AVAILABLE   R RESERVABLE
⊠ UNAVAILABLE   U UNRESERVABLE

METHOD FOR FINDING AND RESERVING AVAILABLE BANDWIDTH IN MULTIHOP MOBILE WIRELESS NETWORKS

BACKGROUND OF THE INVENTION

1. Field of the Invention

The present invention relates to the field of multihop mobile wireless networks and, more particularly, to a method for finding and reserving bandwidth in multihop mobile wireless networks.

2. Description of Related Art

Multihop mobile (or ad hoc) wireless networks can be rapidly deployed without the support of fixed infrastructure. Each node in the network acts as a router as well as a host. The nodes are free to move randomly and organize themselves arbitrarily. Therefore, the topology of the network may change rapidly and unpredictably. These networks are found in applications such as disaster relief, military operations, and short-term activities.

In the multihop mobile wireless networks, the CDMA (Code Division Multiple Access) spread spectrum modulation technique is used for the radio channels and each channel is slotted by the TDMA (Time Division Multiple Access). Mobile nodes within two hops are assigned different spreading codes to avoid the hidden terminal problem.

Bandwidth reservation is essential in supporting Quality of Service (QoS) in multihop mobile wireless networks. To reserve bandwidth along a path from a source node to a destination node, the available bandwidth (in terms of number of data slots) of the path need to be found first in order to determine whether the requested bandwidth can be satisfied. The sufficient number of data slots on each of the links-along the path are reserved.

In a time-slotted network, finding the available bandwidth of a multihop path is known to be a NP-complete. A conventional heuristic method uses the DSDV (Destination-Sequenced Distance-Vector) routing algorithm to find and reserve the available bandwidth in a hop-by-hop manner starting from the destination node toward the source node. However, because the available common free slots of the next hop are unknown in the process, it is likely to find a bandwidth smaller that the actual available one due to the lack of network information. Therefore, it is desirable to provide an improved method to mitigate and/or obviate the aforementioned problems.

SUMMARY OF THE INVENTION

The object of the present invention is to provide a method for finding and reserving bandwidth in multihop mobile wireless networks, which is able to accurately determine the bandwidth in the path and reserve the same, thereby increasing the network performance.

To achieve the object, the method for finding and reserving bandwidth in multihop mobile wireless networks in accordance with the present invention first finds the common free slots of all the links on a path, and marks the common free slots as "available" slots. Then, the slots among the common free slots which are not on the same positions in the TDMA frame as the common free slots of the downstream and upstream links for each link are found. The found slots are marked as "reservable" slots. The current bandwidth of a link is defined as the current number of reservable slots on the link. Next, An iterative process is performed to try to increase the bandwidth of the link having the smallest current bandwidth such that the bandwidth of the path can be increased, wherein, at each iteration, the link with the smallest current bandwidth is processed to try to increase the current bandwidth of the link under processing by marking the common free slot which has the least effect on its downstream and upstream links as a "reservable" slot.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
FIG. 1 shows an example path in the multihop mobile wireless network.

In the multihop mobile wireless networks to execute the method of the present invention for finding and reserving the available bandwidth, the CDMA spread spectrum modulation technique is used for the radio channels and each channel is divided by the TDMA into multiple slots. Transmitter-based code assignment is used to assign a code to each transmitter for data transmission, and transmission time scale is divided into frames of fixed length. Each of the frames is consisted of a number of control slots and information slots. The control slots are used for the transmission of control information such as synchronization, routing, bandwidth reservation, etc. The information slots are used for the transmission of data packets. Half-duplex mode of operation is assumed.

In multihop mobile wireless networks, a link exists between two nodes if each of the two nodes can receive strong enough radio signal from the other node. In each of the nodes in the network, each information slot in a frame can be marked as either "reserved" for providing QoS for a connection or "free" to indicate that it is available.

The information slots that are free at both of the two end nodes of a link are said to be the common free slots of the link. The available bandwidth of a link is the number of common free slots of the link.

The procedure to find the available bandwidth along a path in a wireless multihop network in accordance with the method of the present invention is as follows. First of all, find the common-free slots of all the links on the path. Mark the common free slots as "available" slots. Next, for each link, find the slots among the common free slots which are not on the same positions in the TDMA frame as the common free slots of the downstream and upstream links. These information slots can be definitely used for reservation of bandwidth on the path. Therefore, these common free slots are marked as "reservable" slots, and the current bandwidth of a link is defined as the current number of reservable slots on the link.

If a common free slot is on the same position in the TDMA frame as any of the common free slots of the downstream or upstream link, this slot can be used on only one of the two neighboring links. Therefore, if a common free slot is not on the same position in the TDMA frame as any of the common free slots of the downstream and upstream links, this free slot can definitely be used for reservation of bandwidth on this path. In addition, at this stage, each of the common free slots that are not marked "reservable" must be on the same position in the TDMA frame as a common free slot on one or both of the neighboring links.

The rest of the steps of the method in accordance with the present invention are iterative, so as to try to increase the bandwidth of the link having the smallest current bandwidth (referred to as "bottleneck link") such that the bandwidth of the path can be increased. At each iteration, the link with the smallest current bandwidth is processed. The method of the present invention tries to increase the current bandwidth of the link under processing by marking the common free slot which has the least effect on its downstream and upstream links as a "reservable" slot. That is, the bandwidth is increased in a bottleneck-link-first manner. The iterative steps are as follows.

1. If any one of the links along the path does not have any common free slot which is marked as "available," the iterative process stops and the current bandwidth of the link is the available bandwidth of the path. Otherwise, find and select the link with the smallest current bandwidth. If there are two or more links with the same smallest current bandwidth, select the link having the minimum number of common free slots remained. If there is a tie, one of the links is selected randomly.

2. For each common free slot of the selected link, find the number of neighboring links that has a common free slot which is marked as "available" on the same position in the TDMA frame as the slot. This number is referred to as the number of overlapped links of this slot.

3. Find the common free slot of the link under processing which is marked as "available" and has the minimum number of overlapped links. If there is a tie, select one of the slots randomly. Increase the current bandwidth of the link by one slot and mark the slot as "reservable." Put an "unreservable" mark on the common free slot(s) of the neighboring link(s) which are on the same position in the TDMA frame as the selected slot.

4. Go to step 1.

Figure 2:
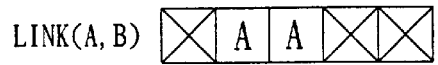
FIG. 2 schematically illustrates the status of the slots in executing the method in accordance with the present invention.
Figure 2:
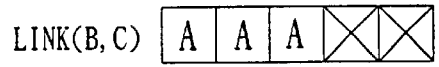
Figure 2:
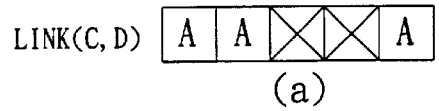
Figure 2:
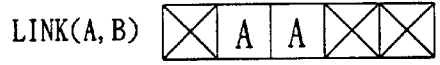
Figure 2:
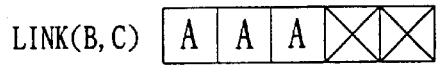
Figure 2:
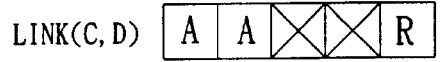
Figure 2:
Figure 2:
Figure 2:
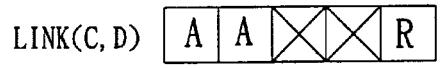
Figure 2:
Figure 2:
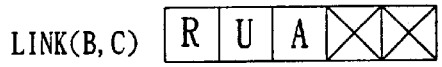
Figure 2:
Figure 2:
Figure 2:
Figure 2:

With reference to FIG. 1, there is shown an example path for illustrating the method of the present invention. As shown, there are four nodes A, B, C and D along the path. The number of the information slots in a TDMA frame is assumed to be 5. Also with reference to FIG. 2(a), let the common free slots of links (A,B), (B,C), and (C,D) be those slots that are marked as "available." Initially, the current bandwidths of the links are zero. With reference to FIG. 2(b), the fifth information slot of link (C,D) is marked as a "reservable" slot since it can be definitely used for reservation of bandwidth on the path. As such, the current bandwidths of links (A,B), (B,C), and (C,D) are 0, 0, and 1 information slot, respectively.

Next, the link with the smallest current bandwidth is to be found. As shown, the links (A,B) and (B,C) have the same smallest current bandwidth. Further, the link (A,B) has the minimum number of common free slots remained, and thus the link (A,B) is selected. On link (A,B), there are two common free slots marked as "available" and are on the same positions in the TDMA frame as two of the common free slots of link (B,C). Select one of the two slots randomly. Supposed that the second slot is selected. Mark the second slot of link (A,B) as a "reservable" slot. In the mean time, the second slot of link (B,C) is marked as "unreservable." The current available bandwidth of the links become 1, 0, and 1, respectively. The status of the slots are shown in FIG. 2(c).

In the next two iterations, links (B,C) and (A,B) are selected respectively. The resulting status of the slots are shown in FIGS. 2(d) and (e) respectively. At this stage, none of the slots of the link (B,C) is marked as "available." Therefore, the iterative process stops; and the bandwidth of the path is found to be one information slot. Accordingly, the reserved slots are determined thereby reserving the bandwidth.

Figure 3:
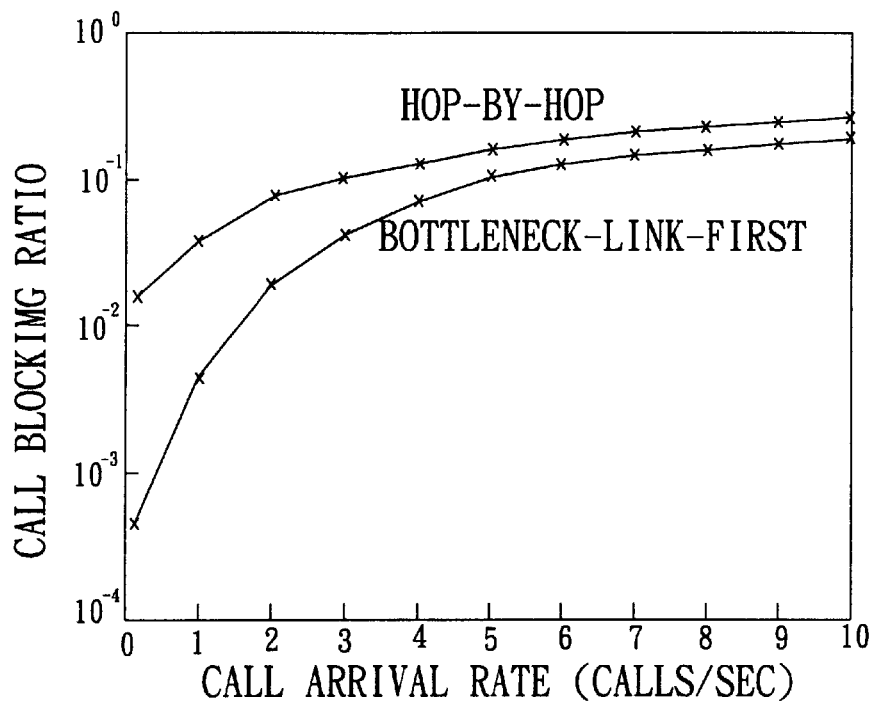
FIG. 3 shows a comparison of the call blocking ratios of the present bottleneck-link-first method and the conventional hop-by-hop method.
Figure 4:
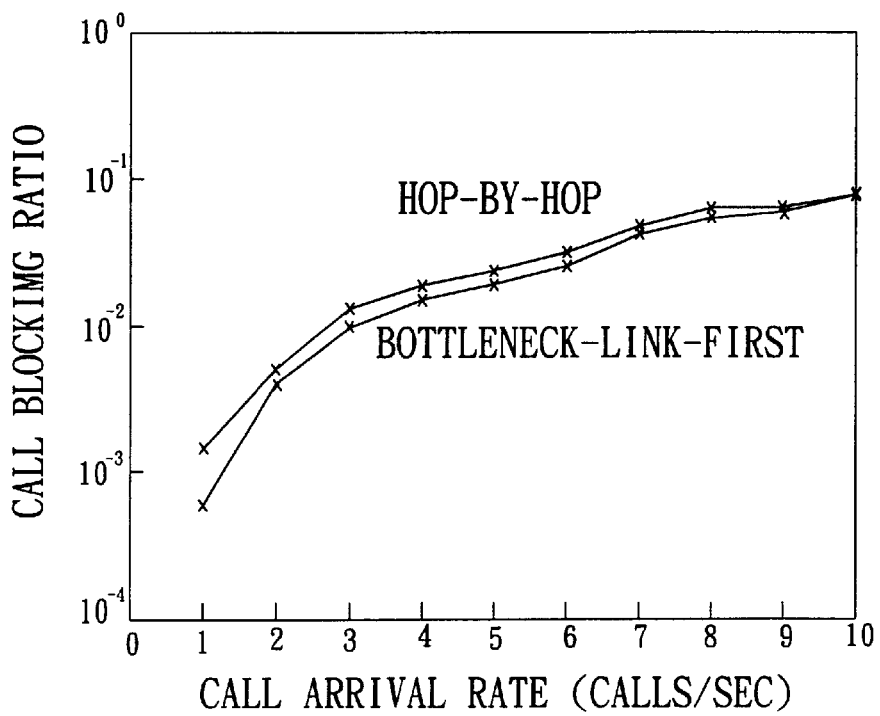
FIG. 4 shows a comparison of the call blocking ratios of the present bottleneck-link-first method and the conventional hop-by-hop method for those calls whose bandwidth requirements are 1 information slot.
Figure 5:
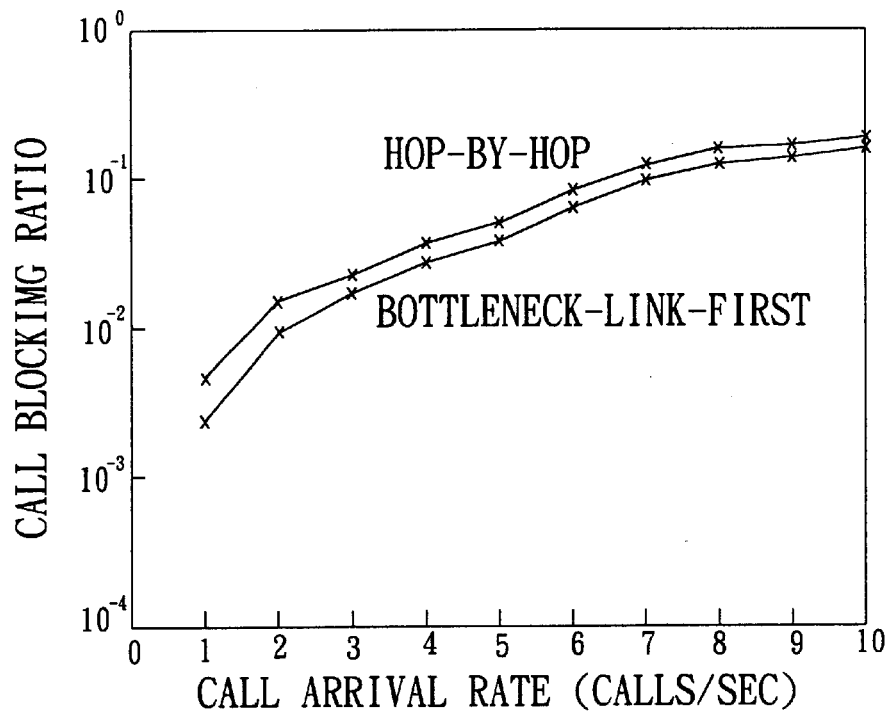
FIG. 5 shows a comparison of the call blocking ratios of the present bottleneck-link-first method and the conventional hop-by-hop method for those calls whose bandwidth requirements are 2 information slots.
Figure 6:
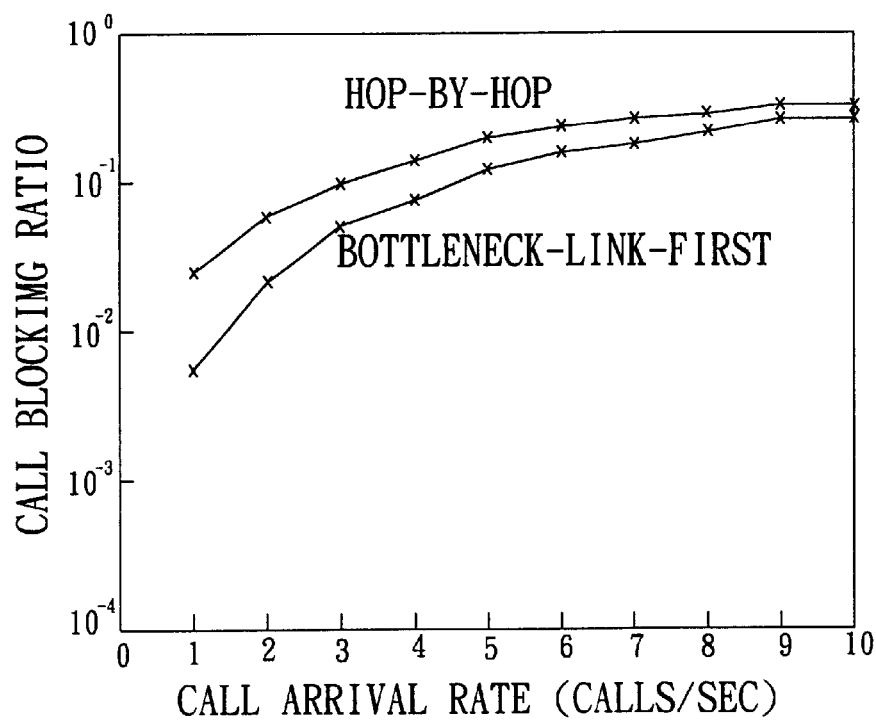
FIG. 6 shows a comparison of the call blocking ratios of the present bottleneck-link-first method and the conventional hop-by-hop method for those calls whose bandwidth requirements are 3 information slots.
Figure 7:
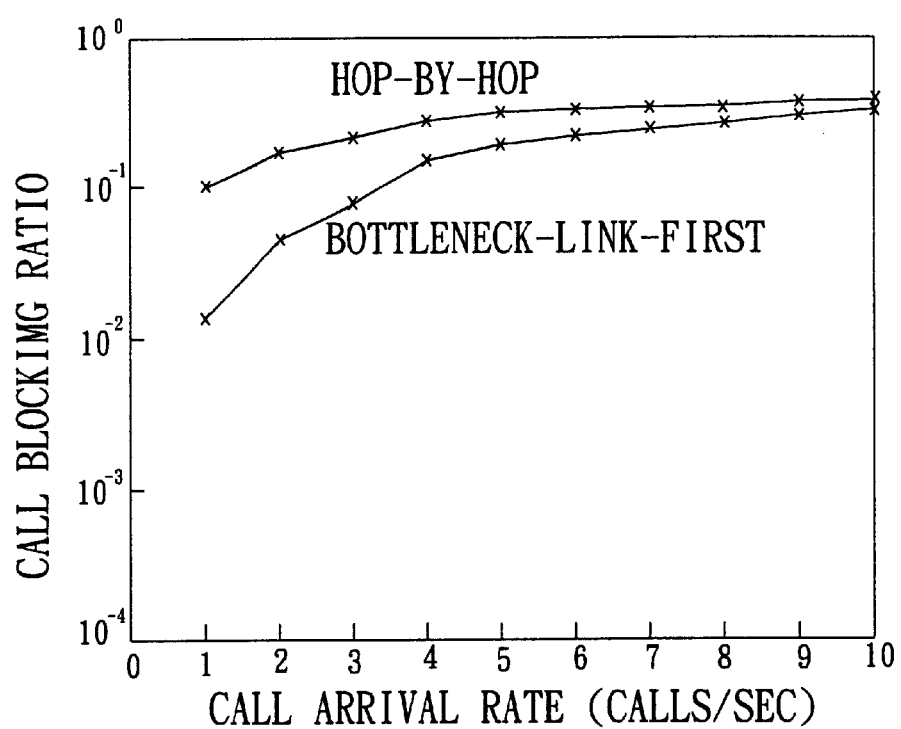
FIG. 7 shows a comparison of the call blocking ratios of the present bottleneck-link-first method and the conventional hop-by-hop method for those calls whose bandwidth requirements are 4 information, slots.

To verify the performance of the method in accordance with the present invention, FIG. 3 compares the call blocking ratios of the present method (denoted by bottleneck-link-first) and the conventional method (denoted by hop-by-hop). From the figure, it is illustrated that the present bottleneck-link-first method produces significantly lower call blocking ratio than the conventional hop-by-hop method. Furthermore, FIGS. 4–7 show the call blocking ratios of those calls whose bandwidth requirements are 1, 2, 3, and 4 information slots respectively. From these figures, it is illustrated that the present bottleneck-link-first method produces significantly lower call blocking ratio than the conventional hop-by-hop method for those calls which require relatively large bandwidth.

Although the present invention has been explained in relation to its preferred embodiment, it is to be understood that many other possible modifications and variations can be made without departing from the spirit and scope of the invention as hereinafter claimed.

What is claimed is:

1. In a multihop mobile wireless network using CDMA spread spectrum modulation for radio channels, each channel being divided by TDMA into multiple slots, transmission time scale being divided into frames of fixed length, each frame having a number of control slots and information slots, a link existing between two nodes if each of the two nodes can receive strong enough radio signal from the other node, each information slot being marked as "reserved" for providing quality of service or "free" to indicate that it is available, the information slots that are free at two end nodes of a link being defined to be the common free slots of the link, the available bandwidth of a link being defined as the number of common free slots of the link, a method for finding and reserving bandwidth along a path comprising the steps of:

(A) finding the common free slots of all the links on the path, and marking the common free slots as "available" slots;

(B) finding slots among the common free slots having positions that are different in the TDMA frame than the positions of common free slots of the downstream and upstream links with respect to each link, marking the found slots as "reservable" slots, and defining the current bandwidth of a link as the current number of reservable slots on the link; and (C) performing an iterative process to try to increase the bandwidth of the link having the smallest current bandwidth such that the bandwidth of the path can be increased, wherein, at each iteration, the link with the smallest current bandwidth is processed to try to increase the current bandwidth of the link under processing by marking the common free slot which has the least effect on its downstream and upstream links as a "reservable" slot.

2. The method as claimed in claim 1, wherein the step (C) comprises the steps of:

(C1) terminating the iterative process and providing the current bandwidth of the link to be the available bandwidth of the path if any one of the links along the path does not have any common free slot which is marked as "available," otherwise, finding and selecting the link with the smallest current bandwidth;

(C2) finding the number of neighboring links that a common free slot which is marked as "available" in a selected link successively meets with other slots marked as "available" on a same vertical position in the TDMA frame, wherein the number is referred to as the number of overlapped links of the slot;

(C3) finding the common free slot of the link under processing which is marked as "available" and has the minimum number of overlapped links; increasing the current bandwidth of the link by one slot and mark the slot as "reservable;" putting an "unreservable" mark on the common free slots of the neighboring links which are on the same position in the TDMA frame as the selected slot; and (C4) going to step (C1).

3. The method as claimed in claim 1, wherein, when finding the link with the smallest current bandwidth in step (C1), if there are two or more links with the same smallest current bandwidth, the link having the minimum number of common free slots is selected, and if there is a tie, one of the links is selected randomly.

4. The method as claimed in claim 2, wherein, when finding the common free slot of the link under processing which is marked as "available" and has the minimum number of overlapped links in step (C2), if there is a tie, one of the slots is selected randomly.

* * * * *